United States Patent [19]

Huber

[11] Patent Number: 5,436,520
[45] Date of Patent: Jul. 25, 1995

[54] STRUCTURE FOR MOUNTING THE WINDING ENDS OF A STATOR WINDING IN A DYNAMOELECTRIC MACHINE

[75] Inventor: Albert Huber, Möriken, Switzerland

[73] Assignee: ABB Management AG, Baden, Switzerland

[21] Appl. No.: 209,742

[22] Filed: Jan. 18, 1994

[30] Foreign Application Priority Data

Feb. 3, 1993 [DE] Germany ............... 43 02 989.2

[51] Int. Cl.6 ............................................. H02K 3/46
[52] U.S. Cl. ................................... 310/260; 310/43; 310/45; 310/271
[58] Field of Search .............. 310/260, 270, 271, 89, 310/91, 43, 45

[56] References Cited

U.S. PATENT DOCUMENTS

| | | | |
|---|---|---|---|
| 4,088,913 | 5/1978 | Prigorovsky | 310/260 |
| 4,238,339 | 12/1980 | Khutoretsky | 310/260 |
| 4,501,985 | 2/1985 | Dobson et al. | |
| 4,563,607 | 1/1986 | Cooper et al. | |
| 4,800,314 | 1/1989 | Ward et al. | |
| 5,051,642 | 9/1991 | Hediger | 310/260 |
| 5,140,740 | 8/1992 | Weigelt | |

FOREIGN PATENT DOCUMENTS

| | | | |
|---|---|---|---|
| 0432720 | 6/1991 | European Pat. Off. | |
| 1015914 | 9/1957 | Germany | |
| 1197971 | 8/1965 | Germany | |
| 35276 | 7/1970 | Germany | |
| 1613125 | 1/1971 | Germany | |
| 1463796 | 2/1971 | Germany | |
| 2157890 | 6/1972 | Germany | |
| 2362406 | 6/1975 | Germany | 310/260 |
| 4024395 | 3/1991 | Germany | |
| 402146 | 5/1966 | Switzerland | 310/260 |
| 425983 | 6/1967 | Switzerland | |
| 381132 | 7/1973 | U.S.S.R. | 310/260 |
| 807451 | 2/1981 | U.S.S.R. | |
| 1721720 | 3/1992 | U.S.S.R. | |

*Primary Examiner*—R. Skudy
*Attorney, Agent, or Firm*—Oblon, Spivak, McClelland, Maier, & Neustadt

[57] ABSTRACT

When mounting the winding ends of a stator winding in a dynamo, at least an outer ring of synthetic resin saturated cord ring is wound in multiple windings on the winding ends in its plastically deformable state. The synthetic resin does not harden until after the cord ring is affixed. The outer ring is adapted to be installed in the cramped winding head space and is especially suitable for retrofitting purposes.

20 Claims, 4 Drawing Sheets

STRUCTURE FOR MOUNTING THE WINDING ENDS OF A STATOR WINDING IN A DYNAMOELECTRIC MACHINE

BACKGROUND OF THE INVENTION

1. Field of the Invention

The invention relates to a structure for mounting the winding ends of a stator winding in a dynamoelectric machine (which is also referred to herein by other terms as a dynamo, a large electric machine or a turbo generator). The dynamo comprises a rotor and a stator. The stator comprises a sheet metal assembly with stator core end plates and a stator housing enveloping the sheet metal assembly. The rotor is mounted to the housing to rotate within said stator sheet metal assembly and stator core end plates. A stator winding is arranged in grooves in the sheet metal assembly facing said rotor. The ends of the stator winding project axially beyond the sheet metal assembly. The mounting structure comprises an inner ring, which may conform directly to the stator winding ends or a thin spacer may be interposed between the inner ring and the stator ends. The stator ends expand like a hollow cone. The mounting structure also comprises an outer support and means for clamping the stator ends between the inner ring and the outer support. The means for clamping are braced against the face of the sheet metal assembly and/or the stator housing.

2. Discussion of the Background

The invention is an improvement over state of the art mounting structures such as that disclosed, for example, in European patent document EP-A-O 432 720.

The attachment of stator winding ends (winding head) of turbo generators presents specific problems as a consequence of the high stresses to which these winding heads are subjected. The stresses are caused by the electromagnetic force effects, in particular during short-circuiting, oscillations, and different thermal expansions of the stator windings with respect to the stator iron (sheet metal core assembly and stator core end plates) during service. These stresses result sooner or later in loosenings and wear phenomena, which lead finally to line-to-ground fault and short-circuiting.

A series of systems have been introduced to improve the strength of winding heads of large electric machines, the majority of which operate with one-piece rings made of insulating material as the central support element.

German Offenlegungsschrift 1 613 125 discloses a structure for mounting the winding ends of a stator winding in an electric machine comprising an outer ring which conforms externally to a portion of the outer layers of the winding ends and an inner ring, which is independent of the outer ring. The inner ring engages the inner layers of the winding ends. To prevent the inner and outer rings from moving axially with respect to each other, C-shaped brackets envelop the winding ends and are secured to the rings. The two rings are secured together by the C-shaped brackets and are maintained axially spaced from the face of the stator sheet metal assembly by axially extending members secured to the outer ring at one end and to the face of the sheet metal assembly at the other end.

German Auslegeschrift 1 463 796 discloses an axially movable, radially fixed winding head mounting for the stator winding of a turbo generator. The winding heads are separated by means of wedges and spacers and held rigidly between two concentric insulating rings. In addition, the outer insulating ring is attached with respect to the housing sections in the radial direction by way of sliding wedges. The sliding wedges permit the outer insulating ring to move axially due to thermal expansion of the winding head. The outer insulating ring is connected to the stator housing by way of elastic elements.

The winding head mounting disclosed in U.S. Pat. No. 4,800,314 corresponds, on the whole, to that disclosed in German Auslegeschrift 1 463 796, but uses only one outer ring. The winding head ends are fastened by wedges in groups, cemented, and tied with ribbons to this outer ring.

The aforementioned embodiments of winding head supports have given largely satisfactory results in operational practice. However, they have the drawback that during inspection and in particular in the framework of retrofitting (replacement/repair of system critical parts for the purpose of increasing the life span and/or output) time-consuming disassembly and modifications have to be carried out. Thus, destruction of the outer one-piece support ring in order to even remove it is often unavoidable. Owing to the local peculiarities (i.e., cramped working space and expanding cone shape of the stator winding ends), it is then no longer possible to install a new one-piece outer ring in the framework of the retrofit.

To overcome the described problems, a support system is proposed in U.S. Pat. No. 4,563,607 that can be applied to both new constructions and in the framework of retrofitting. There, two adjacent bottom and upper winding ends are connected together in the winding head by means of clamping elements made of a synthetic resin-saturated glass cord.

Another solution to the support problem that is provided in particular for retrofitting is the subject matter of U.S. Pat. No. 5,140,740 or its corresponding European patent document EP-A-0 432 720. The mounting proposed there comprises an inner ring which conforms to the stator winding ends. The stator winding ends expand outwardly like a hollow cone. The outer support comprises an at least two-piece ring or support beams which are connected together and extend in the circumferential direction. Tie bolts, which engage with the inner ring and the outer ring or the support beams, serve to clamp the inner ring and the outer support. As an alternative, the outer ring and the tie bolts can be dispensed with as in the prior art (FIG. 4). Then the inner ring and the front brackets (i.e., stator winding ends) of the winding head are braced by interposition of clamping wedges which bear against angular members. The angular members are attached to the face of the stator sheet metal assembly.

The drawback with the first alternative of this construction is that it requires greater complexity on the connecting side (non-driven side) of the machine. In the alternative without the outer ring or without the support beam, unacceptably high tensile stresses can occur at the face of the stator sheet metal assembly.

SUMMARY OF THE INVENTION

With the above background in mind, an object of the invention is directed toward providing a stator winding end mounting structure of the aforementioned class that can be produced economically and simply and that withstands reliably all of the previously described operating stresses.

Another object of the invention is that the mounting should not only be easy to install during service and maintenance work, particularly within the framework of retrofitting work, but it should also be simple to remove for subsequent service work.

The disadvantage of the previously described structures is overcome according to another object of the invention in that, at least on the connection-sided end of the machine, the outer support comprises, in essence, a synthetic resin-saturated cord ring wound in multiple continuous windings in its plastically deformable state on the stator winding ends. The synthetic resin is not cured until after the cord ring has been affixed.

A further object of the invention lies especially in the fact that the cord ring can be affixed without disassembling the interconnection. The cord ring adapts virtually automatically to the existing spatial peculiarities. The space requirement of the cord ring is very low. Good accessibility to the means for clamping the inner and outer ring is obtained. Likewise, reclamping the entire mounting structure after subsequent servicing is achieved without a great deal of complexity. The mounting structure permits removal of the cord ring without destroying the same.

Embodiments of the invention and the objects to be obtained therefrom are explained in detail with reference to the following drawings, wherein the embodiments are diagrammatically illustrated.

DESCRIPTION OF THE PRIOR ART EMBODIMENT

Figure 1:
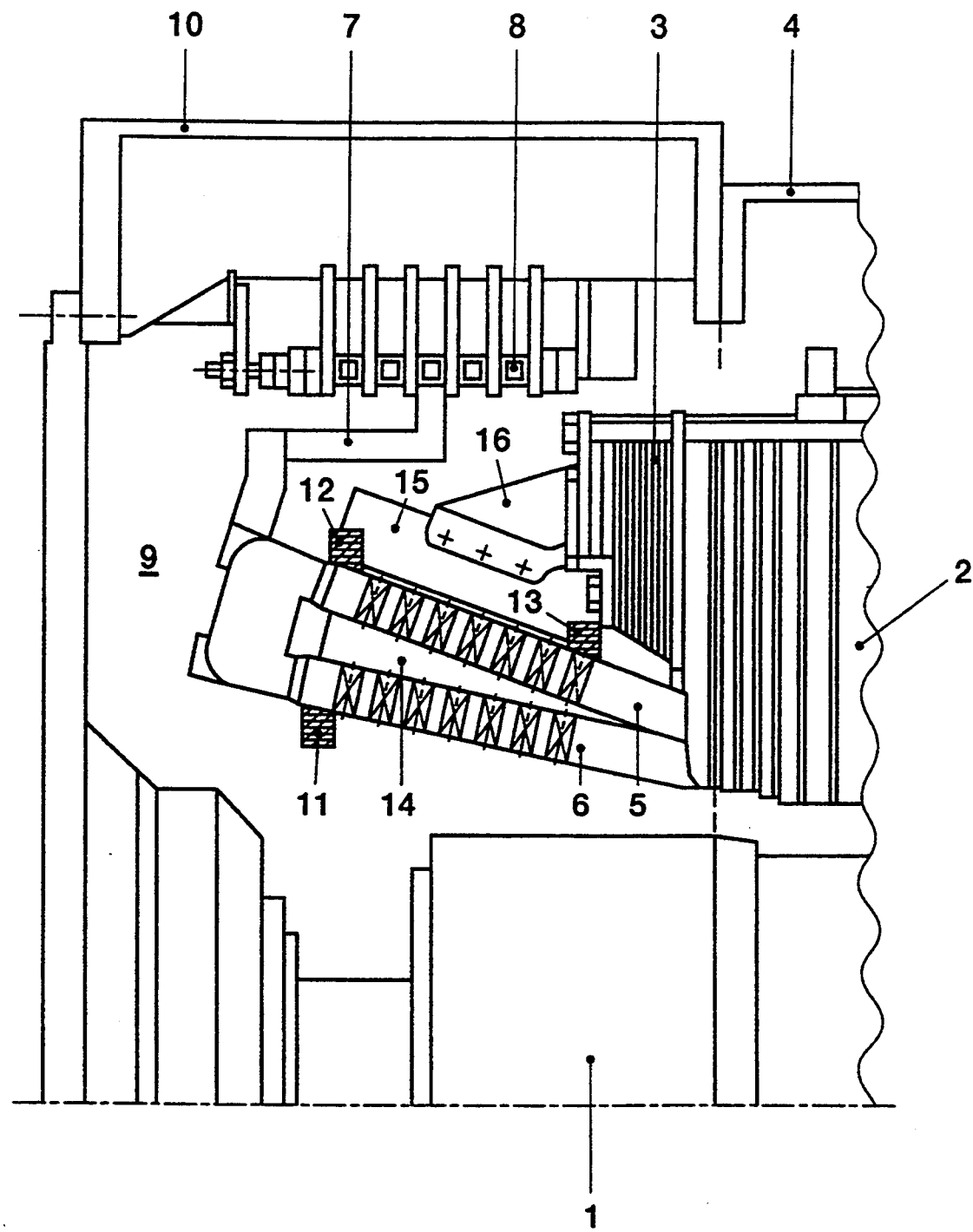
FIG. 1 is a simplified longitudinal view of the non-driven end section of a known turbo generator with a solid inner ring and a solid outer ring, which is braced against the stator core end plate.

In the simplified longitudinal view of the connection side—usually the non-driven end section (exciter end-)—of a known turbo generator according to FIG. 1, the turbo generator comprises a rotor 1, a stator sheet metal assembly 2, a laminated core end plate 3 and a housing 4 enveloping the stator sheet metal assembly 2. The stator winding comprises a bottom bar 5 and an upper bar 6, the ends of which project out of the stator sheet metal assembly 2. The projecting ends, which are also known as front brackets, are connected together electrically and mechanically. All of the brackets together form the winding head. Line connectors 7 run from the front brackets to the ring mains 8 in the winding head space 9, which in the embodiment shown is enveloped by a suitable winding head housing 10. This housing 10 is attached, e.g., screwed, gas-tight to the stator housing 4. However, the stator housing 4 can also be one piece with the said winding head housing 10. For this reason the machine housing is mentioned only in general terms in the following.

The winding head is braced with a solid inner ring 11 made of glass fiber reinforced synthetic resin, whose outer surface is adapted to the radially expanding inner surface of the front brackets, and two solid, one-piece outer rings 12 and 13, made of the same material. A wedge-shaped filler 14 made of insulating material is inserted between the bottom bar 5 and the upper bar 6. The two outer rings 12, 13 mesh with the recesses of an axial support beam 15. Said beam is secured by screws or the like to an attachment angle member 16, which in turn is similarly attached to the stator core end plate 3.

The two outer rings 12, 13 have to be installed prior to the installation of the stator winding and cannot be removed without being destroyed, so that, when the stator winding is being repaired or the like, another kind of winding head support has to be installed. The actual clamping and attachment of the winding head is done by pressing the inner ring 11 into the conically tapering winding basket, which is formed by the upper bars 6, and subsequently locking the inner ring 11 axially.

As can be seen from FIG. 1, very restricted space conditions prevail in the winding head space 9 on the connection side (non-driven side). Even if the outer ring 12 were removable axially over the winding head, at least the numerous line connectors 7 would still have to be removed.

DESCRIPTION OF THE PREFERRED EMBODIMENTS

Figure 2:
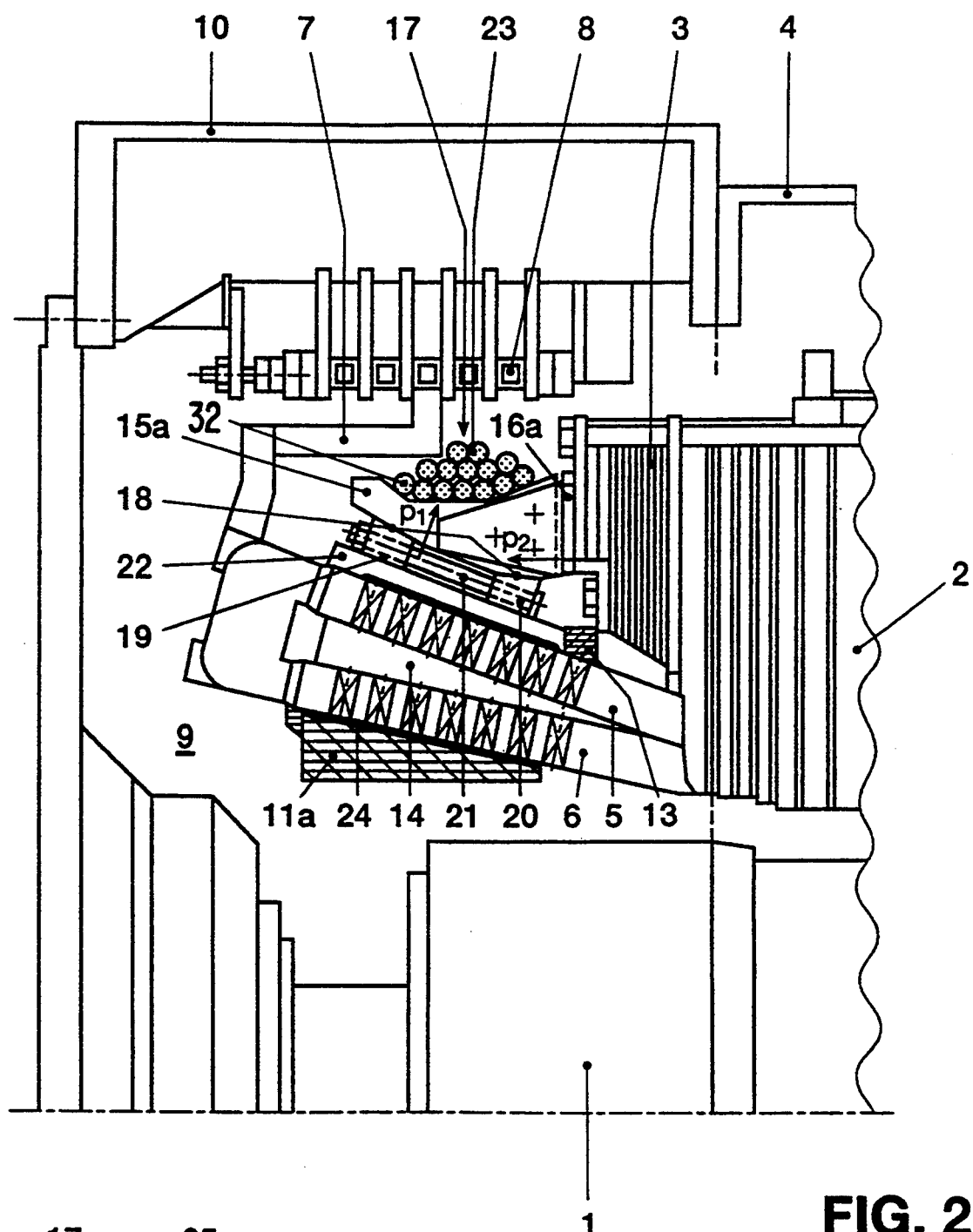
FIG. 2 is a simplified longitudinal view of a first embodiment of the non-driven end section of a turbo generator with a solid inner ring and a cord ring as the outer support, which is braced against the stator core end plate.
Figure 3:
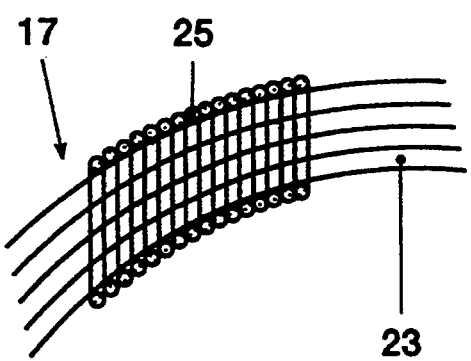
FIG. 3 is a partial longitudinal side view of the cord ring according to FIG. 2.

The present invention will now be explained in detail with reference to FIGS. 2 and 3. In FIG. 2 or 3, the same or identically functioning parts are provided with the same reference numerals which were used with respect to those parts in the description of FIG. 1.

During a repair job or within the framework of retrofitting, the inner ring 11 and the outer ring 12 are removed. The attachment angle members 16 and the support beams 15 are disconnected. According to FIG. 2, they are replaced by attachment angle members 16a, which do not project as far axially and to which are secured the modified support beams 15a. These modified support beams 15a are each provided with a round recess on the radially outward side to receive a cord ring 17. The beams 15a can also be adapted in the circumferential direction to the geometry of the cord ring 17. The surface of the modified support beam 15a that faces the bottom bar 5 runs in the central section approximately parallel to the bottom bar 5 and passes over into a wedged surface 18 in each rim region. These two wedge surfaces 18 act with a double wedge arrangement 19, 20, which can be clamped together by means of screw bolts 21. To distribute the contact pressure over the bottom bar 5 uniformly, a foundation 22 made of insulating material is provided between the double wedge arrangement 19, 20 and the bottom bar 5; and a glass fiber (or similar material) mat 24, to protect the winding, can be provided between the foundation and the bottom bar 5.

The inner ring 11 of FIG. 1 is replaced by a one-piece inner ring 11a with a larger cross sectional area and, like ring 11, is made of glass fiber reinforced synthetic resin. The radial outer surface of the inner ring 11a is adapted to the conicity of the winding head.

The cord ring 17 comprises cords or rovings 23, which are wound continuously in many turns around the modified support beams 15a. In so doing, preferably glass fiber cords are used. Such cords have been used for years to fix in position and space the conductor and coils of winding heads of electric machines and are described, for example, in the Swiss patent document CH-A-425 983. Such cords have a core made of glass fibers, which extend in the longitudinal direction of the cord and which are enveloped by an elastic sheathing or braid. This sheathing can be removed—but does not have to be—following winding. In addition to glass fiber cords, KEVLAR fiber cords (i.e., aromatic polyamide fibers of extremely high tensile strength) are also suitable. The cords are either pulled in dry, wound and then impregnated with synthetic resin, which then hardens, or the cords 23 are impregnated beforehand with a synthetic resin 32 in the B state, which is hardened by heating after being wound.

In the first variation, the impregnating resin, preferably epoxy resin, is introduced through injection, whereby the structure of the glass fibers inside the roving causes uniform saturation due to capillary action. Optionally the cord ring 17 can be reinforced by means of a band made of cords, constructed in the identical manner, or rovings 25 (FIG. 3).

In the hardened state, the cord ring 17 is just a little inferior with respect to strength and elasticity to a solid ring made of glass fiber reinforced synthetic resin. In contrast to a multi-part ring, it can be affixed even under limited spatial conditions.

After the cord ring 17 has finally hardened around the double wedge arrangement 19, 20, the inner ring 11a is pressed in and axially locked in a suitable manner. A sliding foundation 24, e.g., in the form of a glass fiber mat, protects the upper bar 6 against mechanical damages. The actual clamping takes place by tightening the screw bolts 21.

The aforementioned support of the winding head with the inner ring 11a, (outer) cord ring 17 and the double wedge arrangement 19, 20 prevents pull forces on the radially internal section of the stator core end plate 3 and the stator sheet metal assembly 2. Without the cord ring 17, a tension load $P_2$ acts on the stator sheet metal assembly as a consequence of the radially acting tensional force $P_1$ and the lever effect of the support beams 15a and attachment angle members 16a. Such tensional forces result in the loosening of the sheet metal assembly and can consequently damage the insulation of the stator winding in the region of the sheet metal assembly end. The cord ring 17 prevents this lever effect by absorbing the radial force $P_1$.

Figure 4:
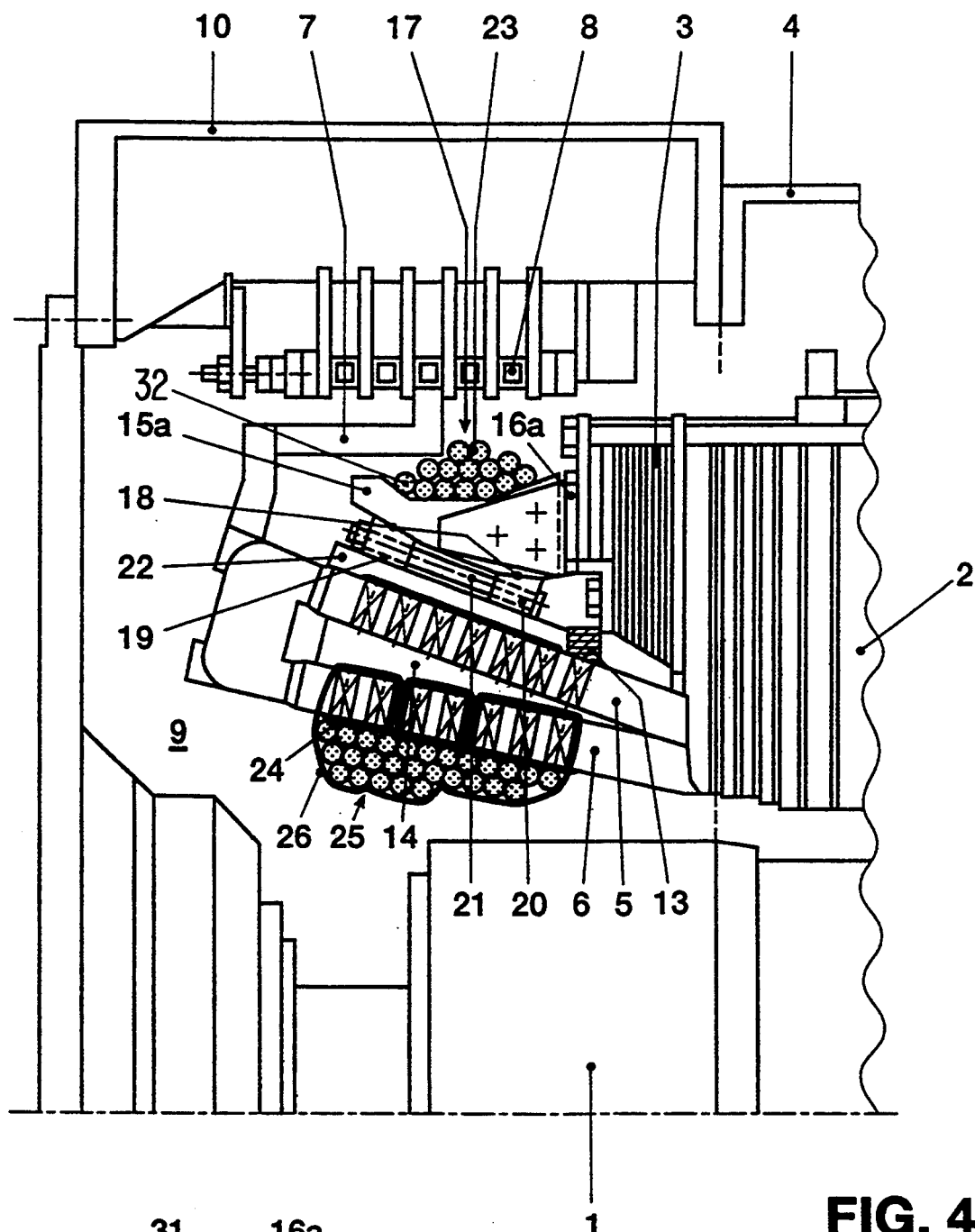
FIG. 4 is a simplified longitudinal view of a second embodiment of the invention of the non-driven end section of a turbo generator with an inner ring, constructed of cords, and a cord ring as the outer support.

The major distinction between the embodiment according to FIG. 4 and that according to FIG. 2 lies in the fact that a cord ring 25 also replaces a solid inner ring 11a. Said cord ring exhibits the same construction as the outer cord ring 17, thus comprises synthetic resin-saturated rovings or cords 23. They are wound on a kind of template or mould outside the machine and compressed into a ring applying pressure and heat after it has been introduced into the interior of the winding head; said ring conforms completely to the upper bars 6. Analogous to the embodiment according to FIG. 2, foundations 24, which are made of glass mats and which during hardening adhere both to the inner cord ring 25 and to the upper bars 6, are provided between the inner cord ring 25 and the front brackets. Following hardening, the inner cord ring 25 can be locked axially by means of bands 26.

The rest of the assembly is analogous to the procedure described with respect to FIG. 2. Following hardening of the inner cord ring 25, the outer cord ring 17 is affixed. Following hardening of the same, the winding head composite, comprising inner cord ring 25, front bracket and outer cord ring 17, is clamped by way of the double wedge arrangement 19, 20 by means of the screw bolts 21.

The support of the winding head that is described above is especially suitable for the connection side (non-driven side) of large electrical machines, because only the cord technology offers the possibility of adapting the outer ring 17 optimally to the existing spatial features; and, therefore, an extremely time consuming disassembly and modification of the ring connections and the leads are superfluous. Even though on the non-connecting side, routinely the drive side or the turbine side, less restricted space conditions prevail, the inner and/or the outer ring can be designed there as a cord ring as illustrated in FIG. 5.

Figure 5:
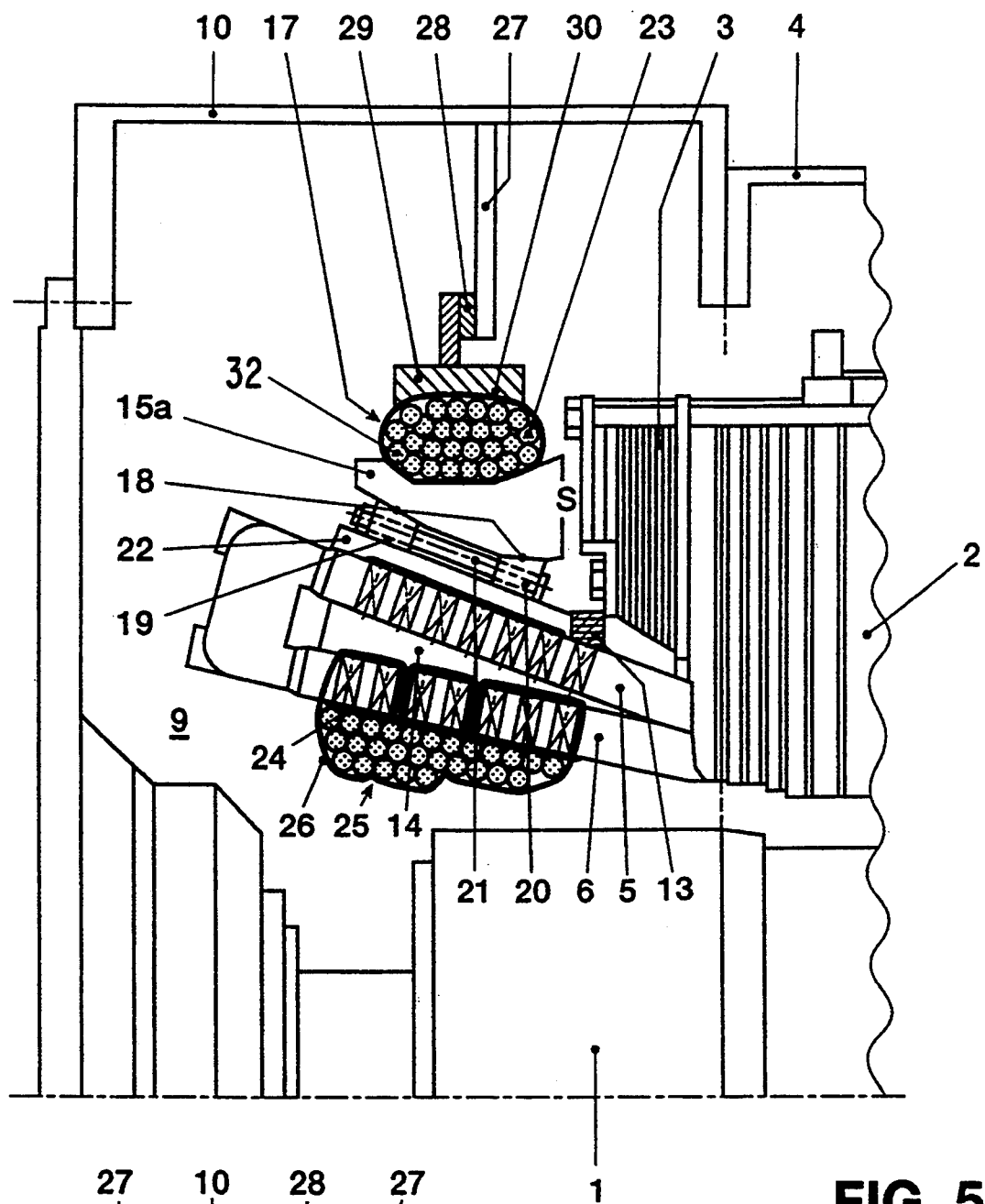
FIG. 5 is a simplified longitudinal view of a third embodiment of the invention of the drive-end section of a turbo generator with an inner ring, constructed of cords, and a cord ring as the outer support, which is braced axially against the stator housing.
Figure 6:
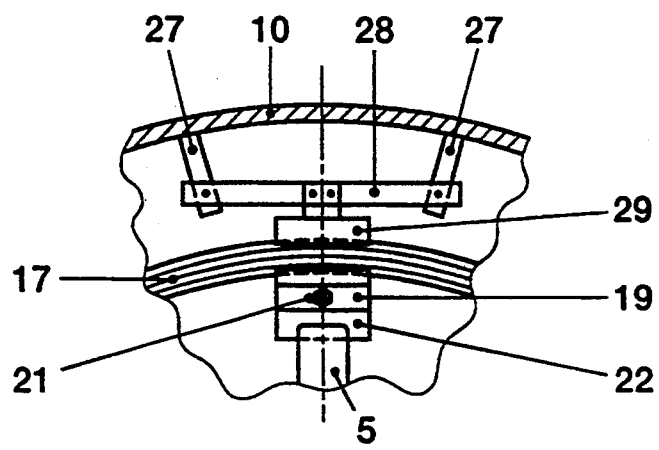
FIG. 6 is an end view of a detail of the axially flexible winding head support on the drive-end side.

In FIG. 5, where all of the identical or identically functioning parts are provided with the same reference numerals as in the previous figures, the inner ring is a cord ring 25; the outer ring is also a cord ring 17. New with respect to the designs shown in FIGS. 2 and 4 is the rigid radial support of the entire drive side winding head with respect to the housing 10, whereas the axial support is flexible. The reason for this property is explained in detail below. These two support functions are assumed by the braces 27, which face radially toward the inside and which are attached to the winding head housing 10. Between these braces 27 are attached axially flexible leaf springs 28, which extend azimuthally and to whose central section is attached a T-shaped support 29, as shown from the partial end view in FIG. 6. The radially internal surface 30 of the supports 29 is curved so as to be concave both in the circumferential direction and axially and serves as an abutment for the cord ring 17.

As an alternative, the braces 27 can be designed as leaf springs. In this case the T-shaped supports 29 are attached directly to the braces (not illustrated). Both in the illustrated case and in said alternative case, the attachment angle members are dispensed with (members 16a in FIGS. 2 and 4); a gap S remains between the support beam 15a and the face of the stator core end plate 3.

Figure 7:
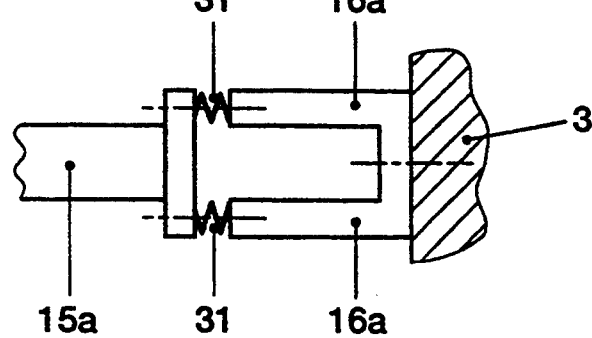
FIG. 7 is a top view of an axially flexible attachment of the support beams, bearing the cord ring, on the stator core end plate.

Another possibility of an axially flexible outer support of the winding head consists of bracing it so as to be axially flexible, not against the winding head housing 10, but rather against the stator core end plate 3. In this variation the braces 27, leaf springs 28 and the T-shaped supports 29 are dispensed with. Analogous to FIGS. 2 and 4, the support angle members 16a and support beam 15a are then provided; however, they are not connected together rigidly but rather with axially acting spring elements, e.g., spring washers or cup springs 31, which are inserted in between, as shown in FIG. 7. The spring washers or cup springs 31 permit relative movement between the winding head and the stator core end plate 3.

The stator winding and stator sheet metal assembly of the large electric machines described here are cooled usually with hydrogen or water. In so doing, the coolant is fed from the exciter side (non-driven side), flows through the winding bar through hollow conductors and emerges again on the turbine side (driven side). The consequence is that the expansion of the exciter-sided winding head and virtually the first half of the active part does not change much with respect to the sheet metal assembly. The larger thermal expansions relative to the sheet metal assembly take place predominantly in the stator winding bar and in the winding head on the turbine side.

Based on this fact, the winding head support on the turbine side is axially flexible (except in machines with no iron length); in contrast, a rigid winding head support can be used on the exciter side (connection side, non-driven side), as illustrated in FIGS. 2 and 4. If desired, however, an axially flexible support according to FIG. 7 can be realized there, too, and with comparatively little complexity.

What is claimed as new and desired to be secured by Letters Patents of the United States is:

1. A dynamo comprising:
   (a) a stator, said stator comprising a sheet metal assembly with a stator core end plate at each end thereof, a stator housing enveloping said sheet metal assembly;
   (b) a rotor, said rotor mounted to said housing for rotation within said stator;
   (c) axial grooves in said sheet metal assembly facing said rotor;
   (d) a stator winding having ends and arranged in said axial grooves in the sheet metal assembly, said ends of said stator winding having an inner surface and projecting axially beyond said sheet metal assembly and one of said stator core end plates;
   (e) a mounting comprising an inner ring which conforms to said inner surface of said ends of said stator winding, an outer support, and means for clamping said inner ring with said outer support;
   (f) said outer support comprises a cord ring which is formed by multiple continuous windings cords in their plastically deformable state arranged in multiple layers on said ends of said stator winding; and
   (g) hardened synthetic resin affixing said cord ring in its assembled position.

2. A dynamo according to claim 1, wherein said cords each have a core made of glass fibers.

3. A dynamo according to claim 1 further comprising:
   (a) support beams;
   (b) means affixing said support beams to said stator, and wherein said cord ring rests on said support beams.

4. A dynamo according to claim 1 including means for bracing said cord ring so that it is radially stiff and axially flexible with respect to the stator.

5. A dynamo according to claim 4, wherein said means for bracing includes:
   (a) braces secured at one end to said stator housing and extending radially inward; and
   (b) supports secured to the opposite end of each of said braces, said supports engaging said cord ring.

6. A dynamo according to claim 4, wherein said means for bracing engages said stator housing to maintain said cord ring radially stiff and axially flexible.

7. A dynamo according to claim 3, wherein the means for affixing said support beams maintains said support beams axially flexible with respect to said stator.

8. A dynamo according to claim 1, wherein said inner ring is a cord ring and comprises multiple windings of cords.

9. A dynamo according to claim 4, wherein said means for bracing is removably attached one of said core end plates.

10. A dynamo according to claim 4, wherein the means for bracing is removably attached to said stator housing.

11. A dynamo according to claim 1 wherein said cords each have a core made of KEVLAR fibers.

12. A dynamo according to claim 4, wherein said dynamo has first and second ends and each of said ends includes said mounting and said means for bracing.

13. A dynamo according to claim 12, wherein said means for bracing engages said stator housing to maintain said cord ring radially stiff and axially flexible.

14. A dynamo according to claim 13, wherein the means for bracing engages respective ones of said stator core end plates to permit relative movement between said ends of said stator winding and said end plates.

15. A dynamo according to the claim 3, further comprising:
   (a) said support beams having an inner surface, said ends of said stator winding having an outer surface, and said clamping means including wedges cooperating with said inner surface of said support beams and said outer surface of said ends of said stator winding;
   (b) means for moving said wedges to adjust the clamping force applied by said inner ring, said support beams and said cord ring on said ends of said stator winding.

16. A dynamo according to claim 15 wherein said inner surface of each of said support beams has an intermediate portion extending substantially parallel to said outer surface of said ends of said stator winding and wedge engaging rim regions which incline outwardly with respect to said outer surface of said ends of said stator winding, and said wedges including a pair of wedges cooperating with each support beam with one wedge of said pair cooperating with one of said wedge engaging rim regions of a support beam and the other wedge of said pair engaging the other of said wedge engaging rim regions of the same support beam.

17. A dynamo according to claim 3 wherein said means affixing said support beams to said stator include angle members with each angle member rigidly affixed at one end to one of said stator core end plates and resiliently affixed at the opposite end to a respective one of said support beams to permit relative movement between said ends of said stator winding and one of said stator core end plates.

18. A dynamo comprising:
   (a) a stator, said stator comprising a sheet metal assembly with a stator core end plate at each end thereof, a stator housing enveloping said sheet metal assembly;
   (b) a rotor, said rotor mounted to said housing for rotation within said stator;
   (c) axial grooves in said sheet metal assembly facing said rotor;
   (d) a stator winding having ends, said stator winding arranged in said axial grooves in said sheet metal assembly, said ends of said stator winding having an inner surface and projecting axially beyond said sheet metal assembly and one of said stator core end plates;

(e) a mounting comprising an inner ring which conforms to said inner surface of said ends of said stator winding, an outer support, and means for clamping said inner ring with said outer support;

(f) said outer support comprises a cord ring which is formed by multiple continuous windings of cords in their plastically deformable state on said ends of said stator winding;

(g) hardened synthetic resin affixing said cord ring in its assembled position;

(h) means for bracing said cord ring so that it is radially stiff and axially flexible with respect to said stator, said means for bracing including:
  (i) braces secured at one end to said stator housing and extending radially inward;
  (ii) leaf springs which are elastic axially of said stator housing and extend azimuthally of said stator housing, attached to the opposite end of each of said braces; and
  (iii) a support secured to said leaf spring, said support engaging said cord ring.

19. A dynamo comprising:
(a) a stator, said stator comprising a sheet metal assembly with a stator core end plate at each end thereof, a stator housing enveloping said sheet metal assembly;
(b) a rotor, said rotor mounted to said housing for rotation within said stator;
(c) axial grooves in said sheet metal assembly facing said rotor;
(d) a stator winding arranged in said axial grooves in said sheet metal assembly, said stator winding including winding ends projecting axially beyond said sheet metal assembly and one of said stator core end plates from each of said axially grooves and expanding outwardly, said winding ends together forming a hollow cone shaped winding head having an inner surface and an outer surface;
(e) a mounting comprising an inner ring which has an outer surface which conforms to said inner surface of said winding head, an outer support, and means for clamping said winding head between said inner ring and said outer support;
(f) said outer support comprising multiple continuous winding of cords stretched to their plastically deformable state and arranged in multiple layers around said winding head; and said cords impregnated with synthetic resin, said synthetic resin hardening after said cords have been wound around said winding head to affix said cord in position forming a cord ring, said cord ring absorbing radial outward forces resulting from actuation of said clamping means.

20. A dynamo according to claim 19 further comprising:
(a) axially extending support beams located outside the outer surface of said winding head, said axially extending support beams having a recessed outer surface;
(b) means affixing said support beams to said stator, and wherein said cord ring is received in said recessed outer surface of said support beams.

* * * * *